United States Patent [19]
Wakeman et al.

[11] Patent Number: 5,790,786
[45] Date of Patent: Aug. 4, 1998

[54] MULTI-MEDIA-ACCESS-CONTROLLER CIRCUIT FOR A NETWORK HUB

[75] Inventors: Larry N. Wakeman, Mountain View; Roy T. Myers, Jr., Santa Clara, both of Calif.

[73] Assignee: National Semiconductor Corporation, Santa Clara, Calif.

[21] Appl. No.: 496,038

[22] Filed: Jun. 28, 1995

[51] Int. Cl.$^6$ .................................................. G06F 13/00
[52] U.S. Cl. .................. 395/200.02; 395/200.2; 395/872; 395/891; 370/363; 370/366
[58] Field of Search .................. 395/200, 85.1, 395/200.02–200.2, 891, 872; 370/85.3, 67, 85.2, 56, 363–366

[56] References Cited

U.S. PATENT DOCUMENTS

| | | | |
|---|---|---|---|
| 5,005,151 | 4/1991 | Kurkowski | 395/856 |
| 5,297,268 | 3/1994 | Lee et al. | 395/491 |
| 5,361,261 | 11/1994 | Edem et al. | 370/85.3 |
| 5,521,928 | 5/1996 | Worsely et al. | 370/67 |
| 5,566,169 | 10/1996 | Rangan et al. | 370/56 |
| 5,621,895 | 4/1997 | Weis et al. | 395/200.17 |

OTHER PUBLICATIONS

International Standard ISO/IEC 8802–3:1992 (*Information Technology—Local and Metropolitan Area Networks—Part 3: Carrier Sense Multiple Access with Collision Detection (CSMA/CD) Access Method and Physical Layer Specifications*), Third Edition, The Institute of Electrical and Electronic Engineers, Inc., 1992, pp. 31–41, 43–47, 49–78, 81–119, and 121–149.

*DP83934 LAN Data Book*, National Semiconductor Corporation, Santa Clara, California, Undated (prior to Jun. 28, 1995), pp. 1–468 to 1–477.

"Document X", Materials submitted under seal which are considered to be proprietary and which are being submitted for consideration under MPEP § 724.

*Primary Examiner*—Christopher B. Shin
*Attorney, Agent, or Firm*—Skjerven, Morrill, MacPherson, Franklin & Friel; Paul J. Winters; Omkar K. Suryadevara

[57] ABSTRACT

A multi-media-access-controller (henceforth "multi-MAC") in accordance with this invention includes a plurality of transmit data path circuits and a plurality of receive data path circuits that respectively transmit and receive data serially on a corresponding plurality of network buses, a single transmit data path controller and a single receive data path controller that monitor status of and control operation of the respective transmit and receive data path circuits. Use of only two data path controllers eliminates the plurality of MACs used in prior art devices and therefore results in significant savings in die area. Use of a single CRC calculator also results in savings in die area.

18 Claims, 14 Drawing Sheets

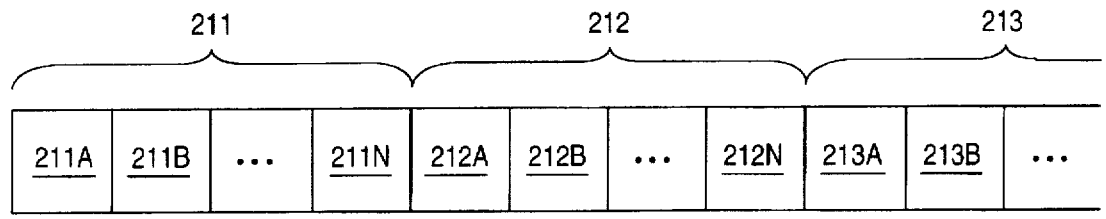
FIG. 2B
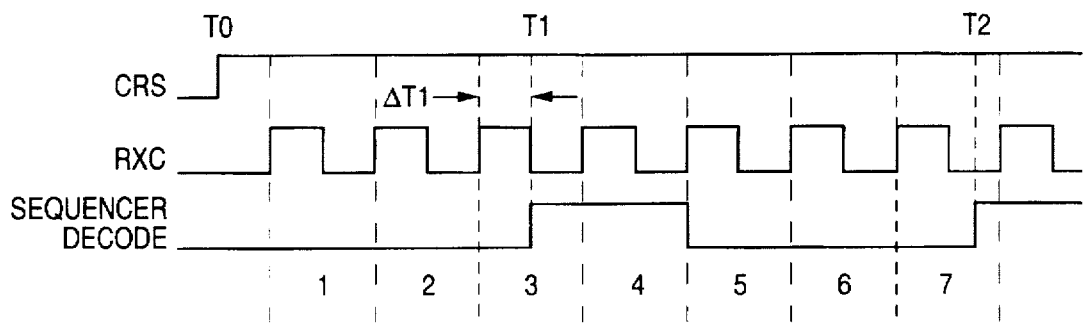
FIG. 5B
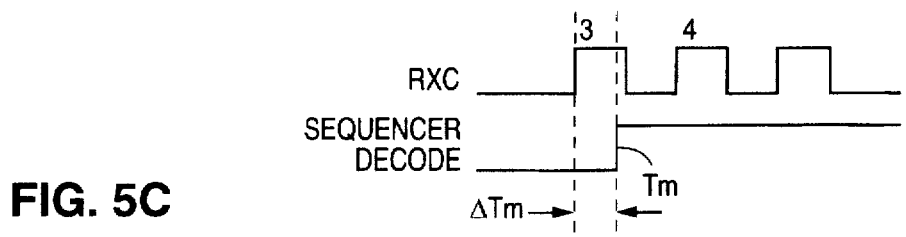
FIG. 5C
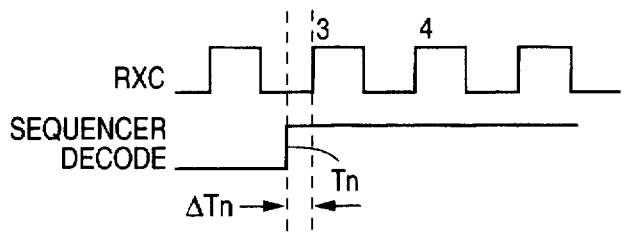
FIG. 5D
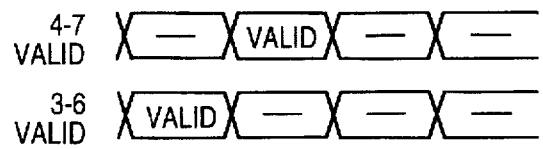

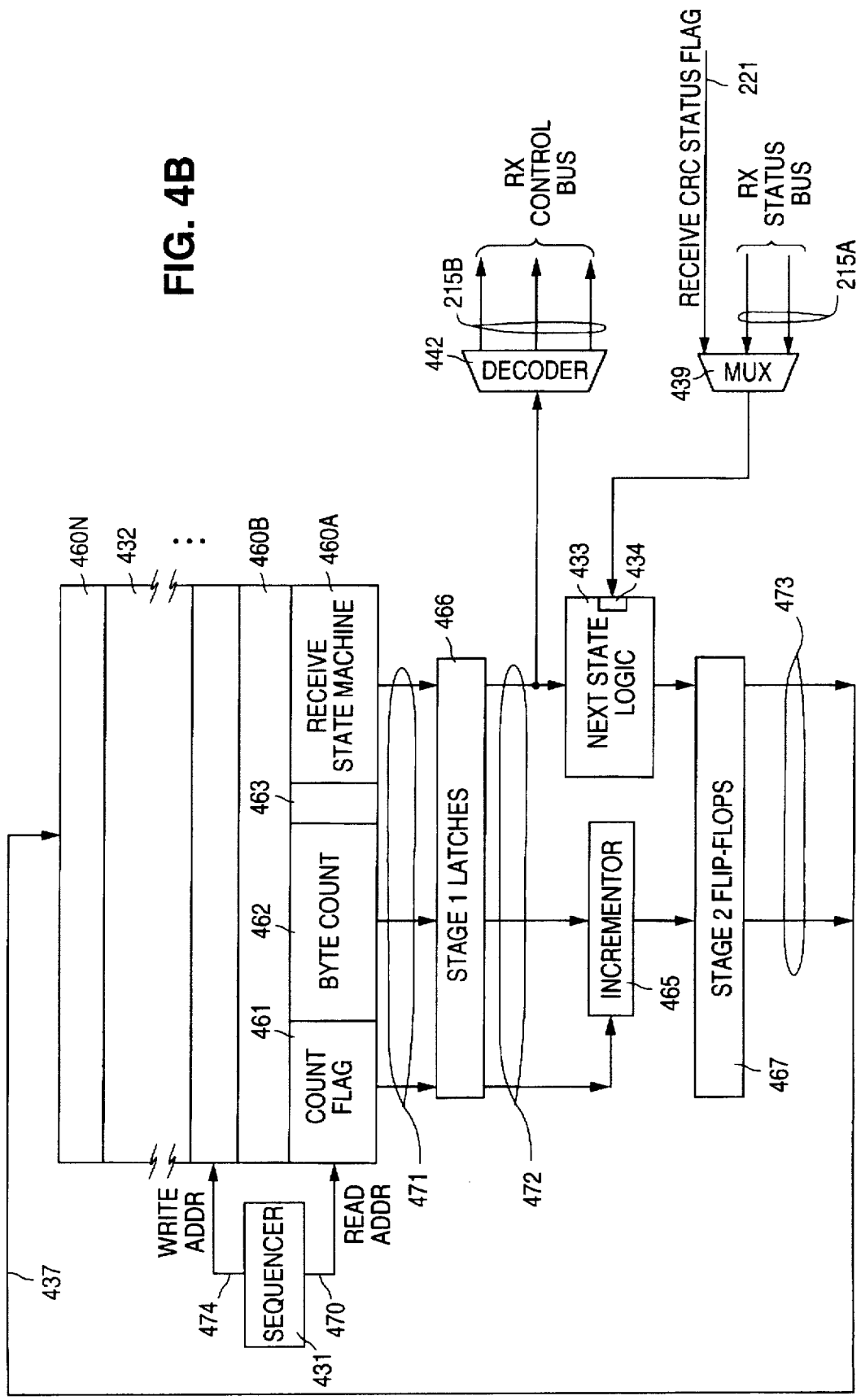

MULTI-MEDIA-ACCESS-CONTROLLER CIRCUIT FOR A NETWORK HUB

FIELD OF THE INVENTION

The present invention relates to media access controllers for transferring data over a network and in particular to a device that includes a number of media access controllers for interfacing to a number of ethernet segments.

DESCRIPTION OF RELATED ART

In an example of a prior art networked computer system 100 (FIG. 1A), computers 101–104 can communicate with each other and also access shared resources, such as a printer 105, over one or more networks, such as ethernets 107–109 that interconnect various computers through an ethernet hub 110. Computers 101–104 can be, for example, industry-standard IBM™ PCs or Apples™ MacIntoshes™.

Data transfer over ethernets 107–109 is conventionally implemented in computers 101–104 by ethernet adapter cards 111–114 that perform the functions of proper addressing, reading and storage of data to be exchanged over ethernets 107–109, for example, using a carrier-sense-multiple-access collision-detect (CSMA/CD) protocol, as described in "International Standard ISO/IEC 8802-3 ANSI/IEEE Std. 802.3", Part 3, Third Edition Mar. 20, 1992, available from IEEE Service Center, 445 Hoes Lane, P.O. Box 1331.

Ethernet hub 110 can serve as a repeater for communications between computers 101, 102 and 104 that are all coupled to the same ethernet 107. Ethernet hub 110 can also serve as a switch that routes packets based on destination address, between computer 103 on ethernet 108, computers 101, 102 and 104 on ethernet 107 and other computers (not shown) on ethernet 109.

FIG. 1B illustrates one example of an ethernet hub 110 that includes a switch-port integrated circuit (switch-port IC) 111, a memory 112 that stores packets, a central processing unit (CPU) 113 that monitors and controls various components, a packet forwarding engine 114 that forwards packets from one port to another port and a direct-memory-access (DMA) unit 115 that transfers packets between switch port IC 111 and memory 112. All these components are coupled to each other by a system bus 116. System bus 116 can be any bus, such as a peripheral component interconnect (PCI) bus or other proprietary implementation.

Ethernet hub 110 can be coupled to a twisted pair cable, coax cable, fiber optic link or other physical media of an ethernet (such as ethernet 107) through an ethernet port 120 on switch-port IC 111. Ethernet port 120 includes an attachment unit interface (AUI) or twisted pair (TP) transceiver 121, a media access controller unit (MAC) 122, a transmit first-in-first-out memory (FIFO) 123 and a receive-first-in-first-out memory (FIFO) 124.

Switch-port IC 111 can include a number of such ethernet ports, for example ethernet port 130 (including AUI/TP transceiver 131, MAC unit 132, transmit FIFO 133 and receive FIFO 134), ethernet port 140 (including AUI/TP transceiver 141, MAC unit 142, transmit FIFO 143 and receive FIFO 144) and ethernet port 150 (including AUI/TP transceiver 151, MAC unit 152, transmit FIFO 153 and receive FIFO 154). Each of ethernet ports 120, 130, 140 and 150 may be coupled by a direct memory access (DMA) interface unit 115 (which may be part of the same IC 111, or may be in a separate IC) to system bus 116. Switch-port IC 111 also includes configuration registers and event counters 170 for supporting various network management functions.

Such a conventional ethernet hub 110 can be built using, for example as switch-port IC 111, the 4-Channel Quad 84C300 AutoDUPLEXT™ CMOS Ethernet 10/100 Mega Bit/Sec Data Link Controllers available from Seeq Technology, Inc., 47131 Bayside Parkway, Fremont, Calif. 94538.

Improvements in ethernet hub components, such as switch-port ICs are always being sought.

SUMMARY OF THE INVENTION

A multi-media-access-controller (also called "multi-MAC") in accordance with this invention time multiplexes the use of circuitry (such as a single transmit data path controller, a single receive data path controller and a single cyclic redundancy check (CRC) checker-generator) to monitor and control a number of transmit and receive data path circuits and implement a network protocol, such as a carrier sense multiple access collision detect (CSMA/CD) protocol, for transferring data over a number of network segments.

In one embodiment, a time multiplexed transmit data path controller includes a state counter logic that is dedicated to service one transmit data path circuit in a given time slot, to service another transmit data path circuit in the next time slot and so on, in a sequential roll-over (i.e. cyclic) fashion. A cycle period is the total time for the transmit data path controller to completely cycle through servicing each transmit data path circuit in the multi-MAC. At the beginning of a new cycle period, the transmit data path controller returns to service the transmit data path circuit that was first serviced in the previous cycle period. The order of service is predetermined, and each transmit data path circuit receives only one service during a given cycle period.

The state counter logic included in the transmit data path controller uses random access memory (RAM) based transmit state machines and counters during a given time slot to monitor and control a corresponding transmit data path circuit that transmits parallel data from a transmit first-in-first-out memory (FIFO) in serial form on a network port.

Similarly, a time multiplexed receive data path controller of this embodiment includes a state counter logic that also uses random access memory (RAM) based receive state machines and counters during a given time slot to monitor and control a corresponding receive data path circuit that stores serial data from a network in parallel form into a receive first-in-first-out memory.

A sequencer (henceforth "control sequencer") is included in each (i.e. transmit and receive) data path controller and generates in a given time slot the address signals for accessing in a sequential roll-over fashion memory locations in RAM that hold state and count signals corresponding to each state machine. The sequencer also drives a state counter logic (in each data path controller) that receives a state signal supplied by the storage elements, status signals from a data path circuit and generates control signals and a new state signal for storage in the accessed memory locations.

A single CRC checker-generator checks CRC checksums of packets received on each receive data path in response to a check CRC signal from receive data path controller and also generates CRC checksum bytes for packets transmitted on each of the transmit data paths in response to a generate CRC signal from transmit data path controller. The CRC checker-generator includes a CRC sequencer, a checksum random access memory (RAM) and a single CRC calculator. The CRC sequencer generates address signals in a sequential roll-over fashion to allow the CRC calculator to read and update partial CRCs stored in CRC RAM for each data path

3 circuit. In one embodiment, during the first half of a time slot, the CRC calculator uses data being transmitted to calculate a partial CRC for a transmit data path circuit and during the second half of the same time slot, the CRC calculator uses data being received to calculate a partial CRC for the receive data path circuit.

Time multiplexed use of a single transmit data path controller, a single receive data path controller and a single CRC checker-generator as described herein eliminates wastage of integrated circuit real estate that is inherent in the prior art's use of a plurality of individual, separate circuitry, such as MACs and CRC calculators. Moreover, use of dual-port RAM allows the state and counters of the next state machine to be read simultaneously e.g. while a current state machine's state and counters are being stored in the RAM. Also, state machine implementation using RAM as described herein is more efficient space wise than using flip flops.

In one specific embodiment, each receive data path circuit starts latching data signals from a network bus into a shift register independent of the availability of the receive data path controller, i.e., a given receive data path circuit does not wait for the specific time slot during which the receive data path controller communicates with this receive data path circuit. To align the beginning of data received from the network with the time slot, each receive data path circuit includes a shift register having a length of 2n, wherein n is the number of bus cycles that occur on a receive input terminal during a cycle period. Therefore, 3 if a given receive data path circuit receives fewer bits than a predetermined number p<n when the time slot of that receive data path circuit occurs, the receive data path circuit simply continues to latch data signals into the shift register and transfers n bits of data at the next time slice. In one embodiment, predetermined number p is the number of bits that are received in a time slot.

BRIEF DESCRIPTION OF THE DRAWINGS

FIG. 2B illustrates a number of cycle periods during which circuitry is time multiplexed.

FIG. 4B illustrates a low-level block diagram of the receive data path controller of FIG. 2A.

4

Figure 4A:
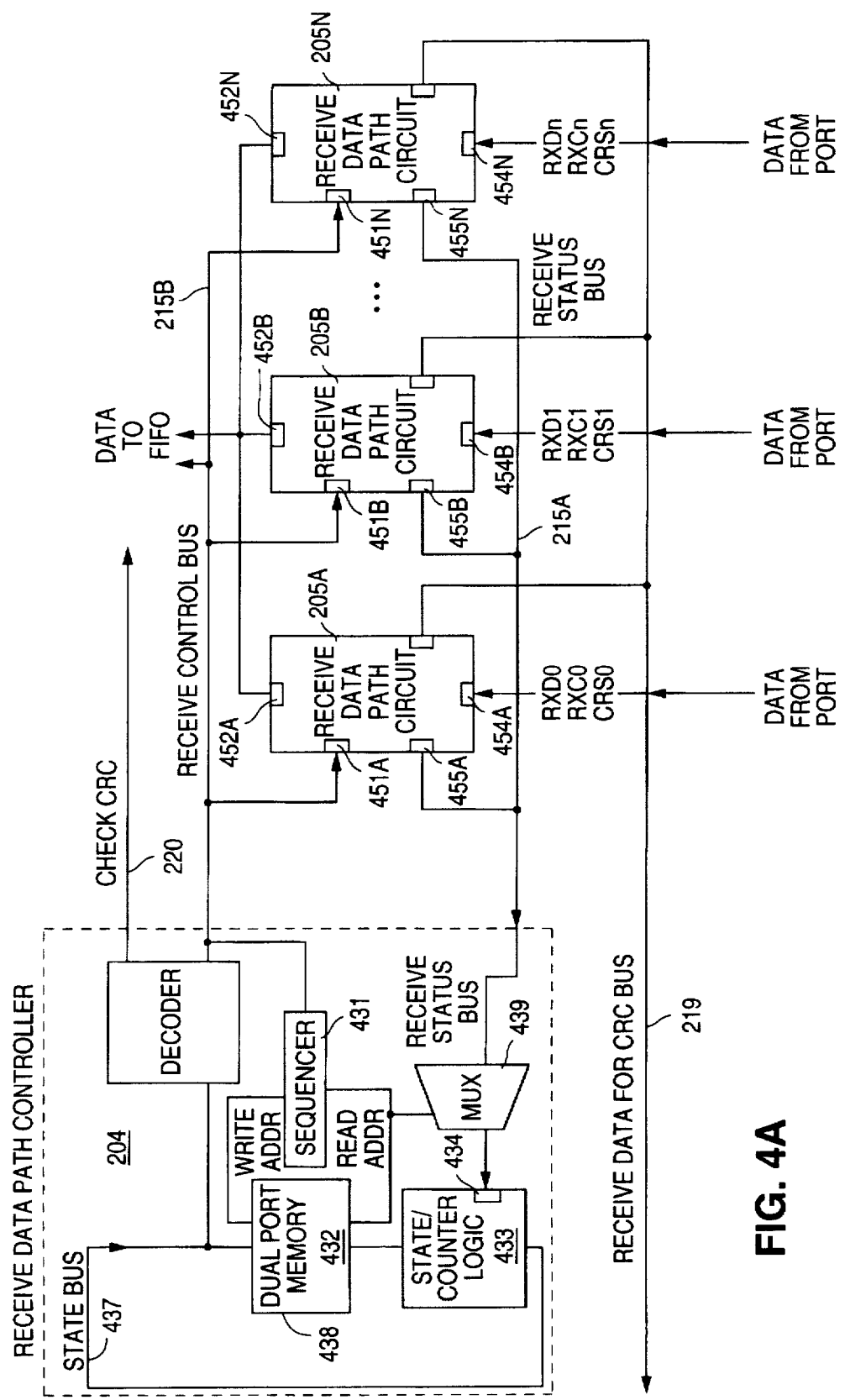
FIG. 4A illustrates in an intermediate-level block diagram of a receive portion of the multi-media-access-controller of FIG. 2A.
Figure 5A:
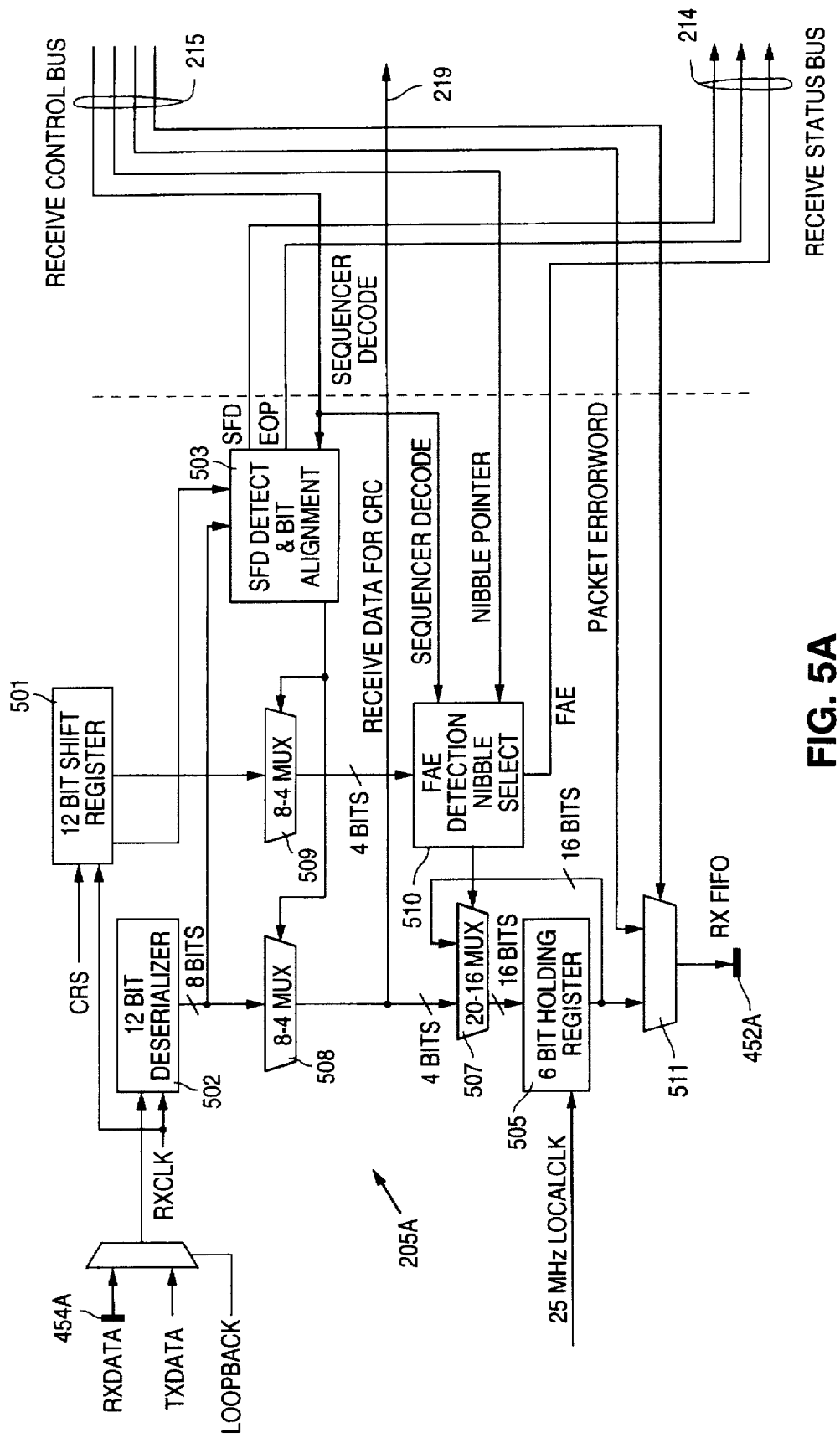
FIG. 5A illustrates a low-level block diagram of a receive data path circuit of FIG. 3A.
Figure 5E:
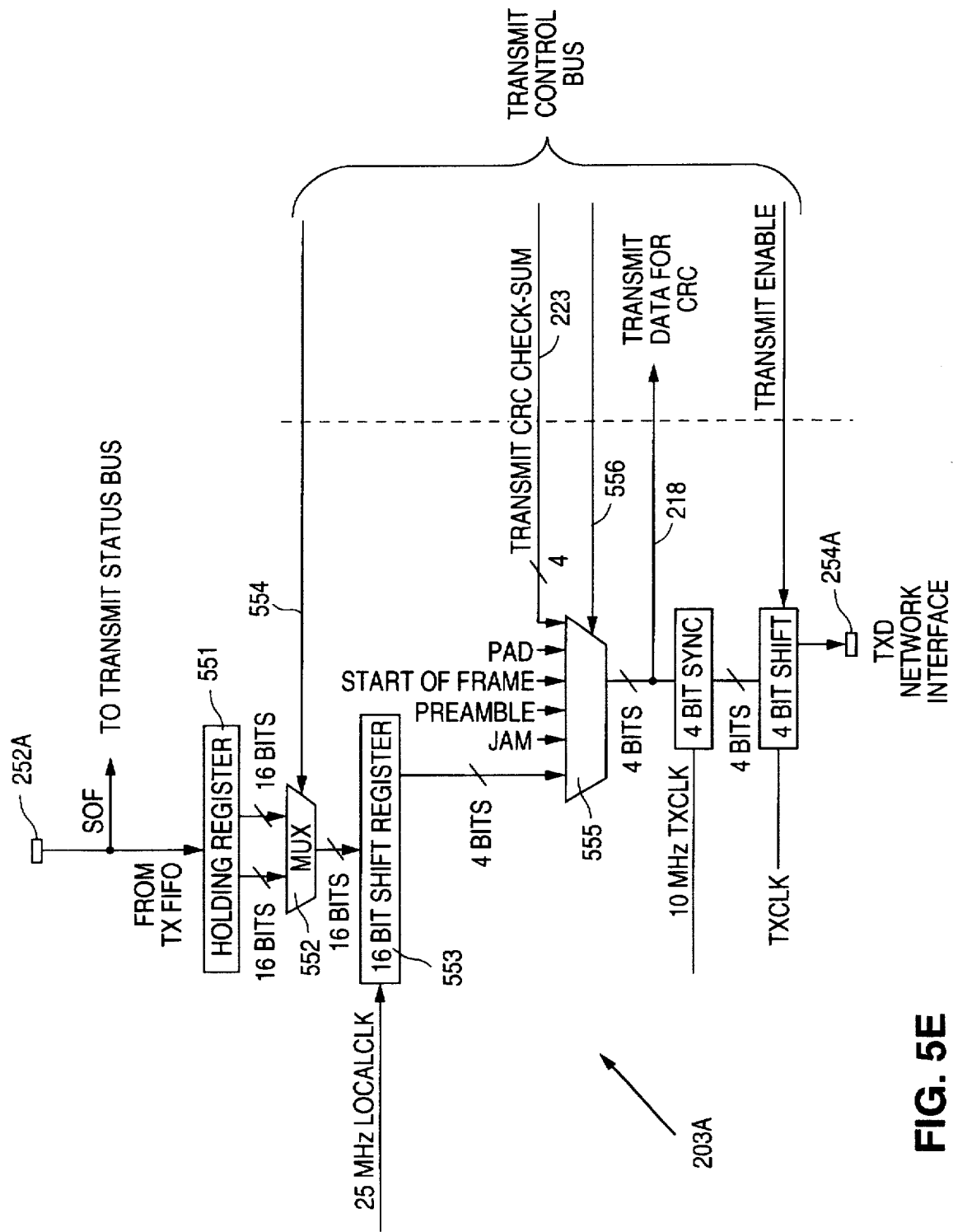
FIG. 5B–5D illustrate the timing relation of signals on various lines in FIG. 5A.

FIG. 5E illustrates a low-level block diagram of a transmit data path circuit of FIG. 4A.

Figure 1A:
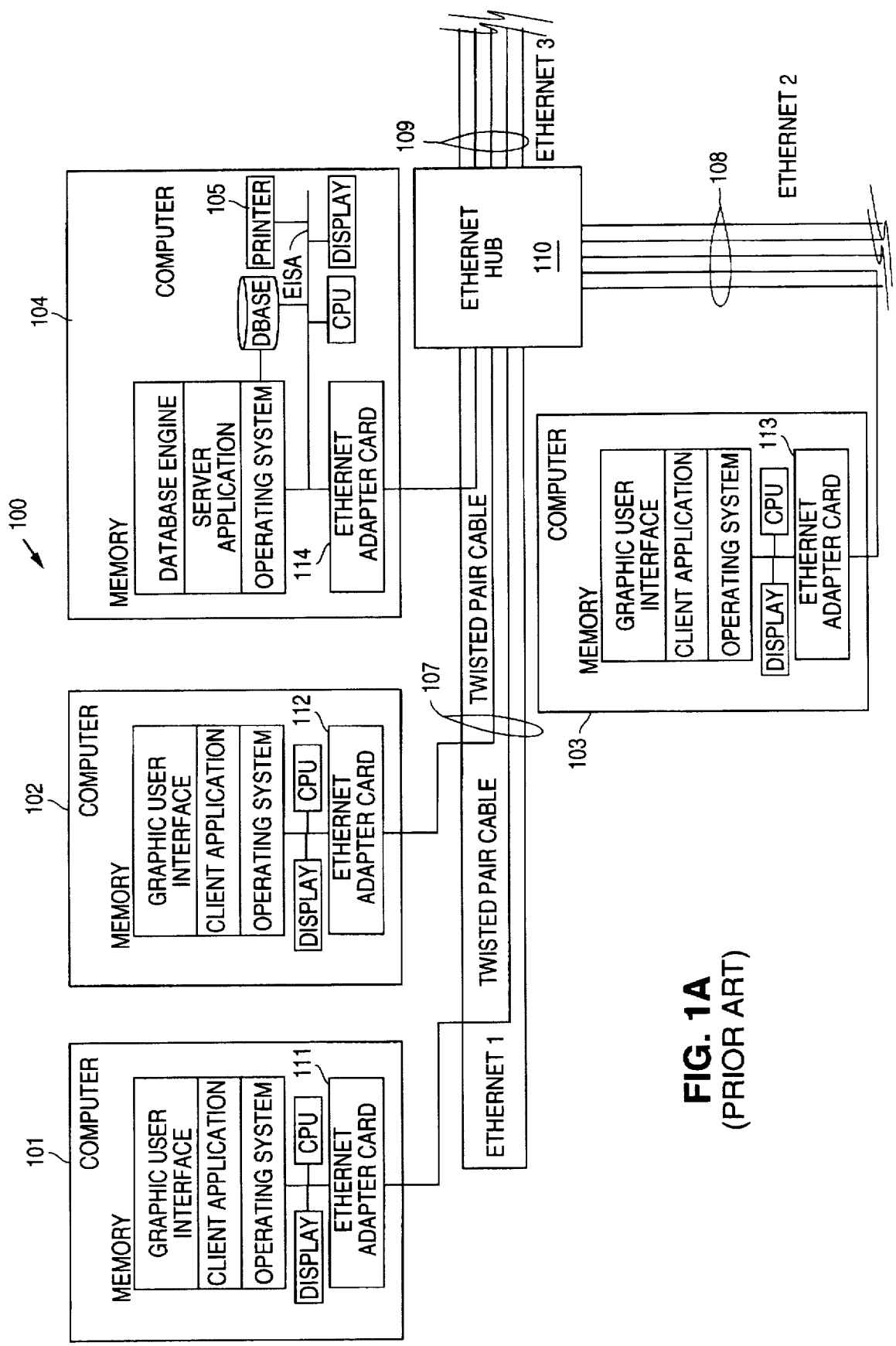
FIG. 1A illustrates in schematic block diagram, a prior art networked computer system.
Figure 1B:
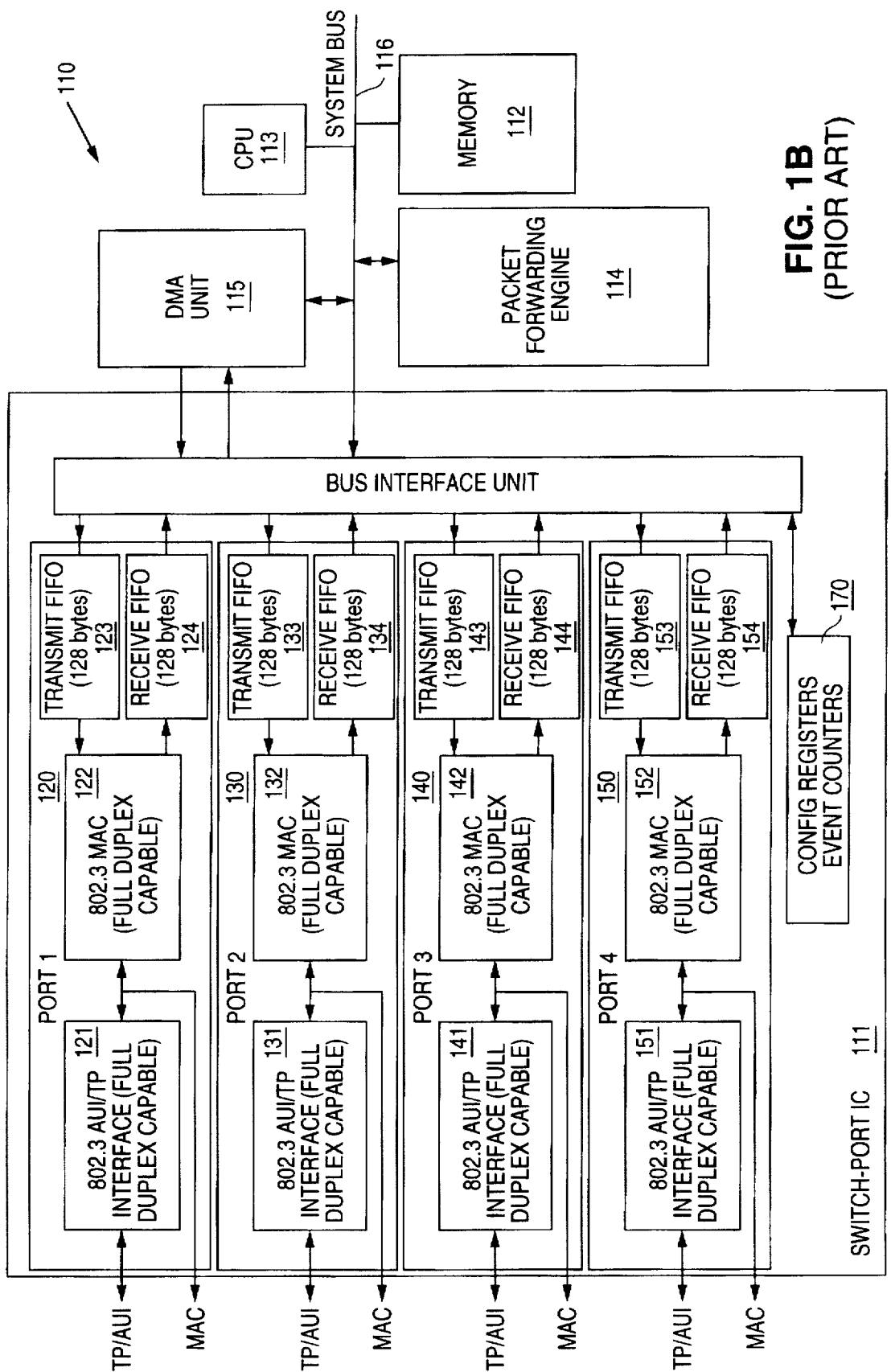
FIG. 1B illustrates in a schematic block diagram, the ethernet hub of FIG. 1A.
Figure 2A:
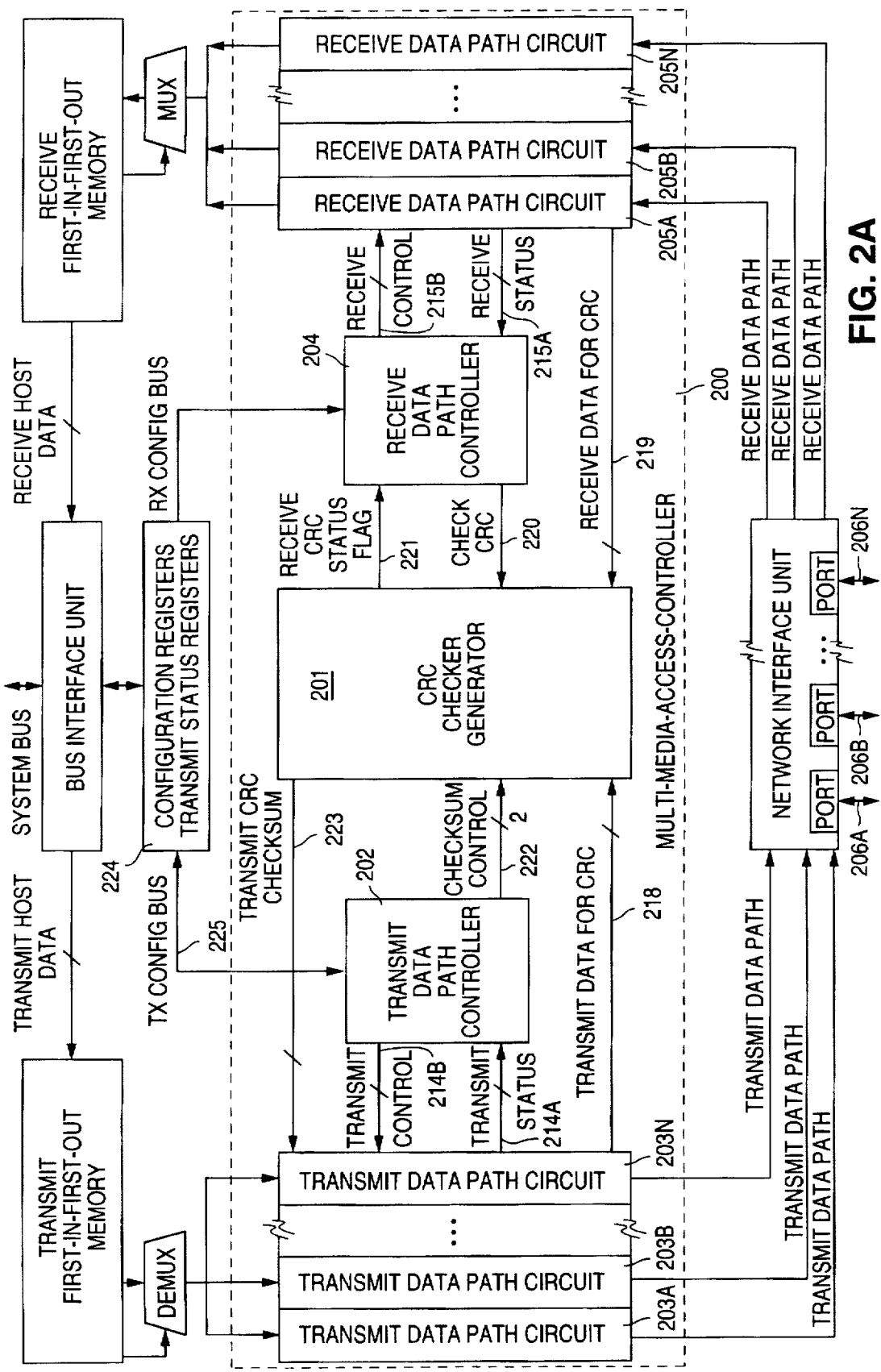
FIG. 2A illustrates in a high-level block diagram, a multi-media-access-controller coupled to a number of transmit and receive data path circuits in one embodiment of this invention.
Figure 6A:
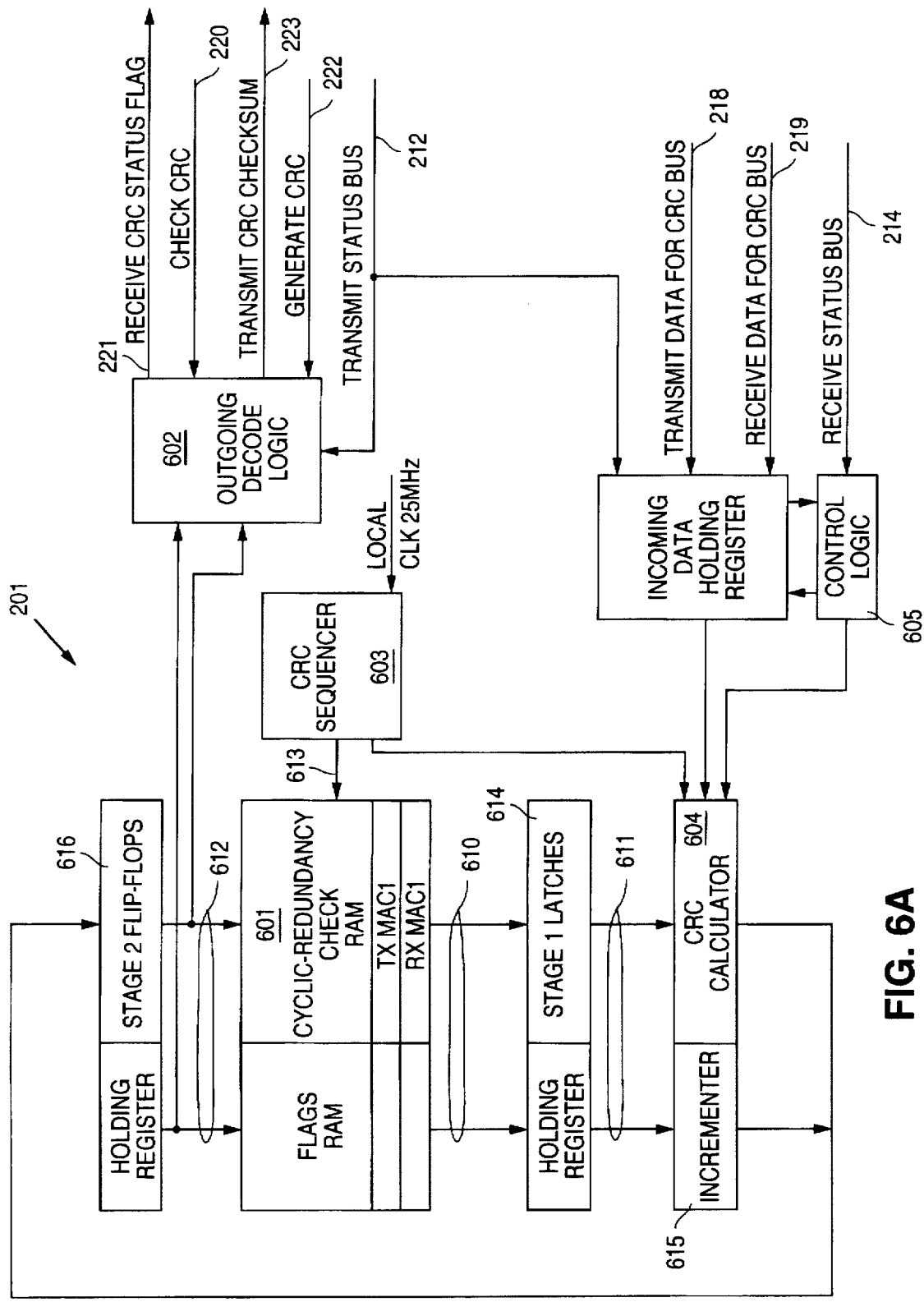

FIG. 6A illustrates a low-level block diagram of a CRC che regenerator of FIG. 2A.

Figure 6B:
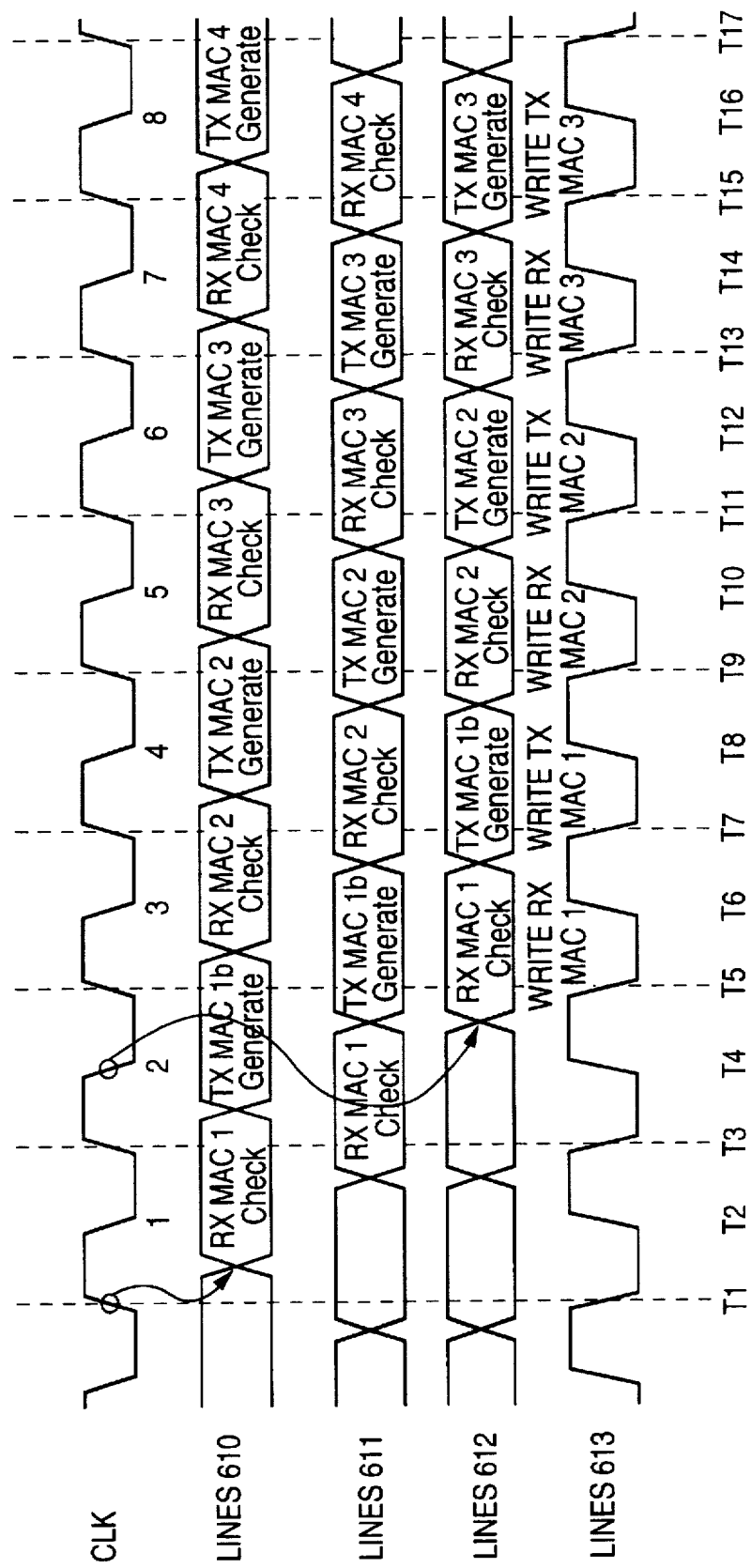

FIG. 6B illustrates in a timing diagram the timing relation of signals on various lines in FIG. 6A.

DETAILED DESCRIPTION

A multi-media-access-controller in accordance with this invention includes a plurality of transmit data path circuits and a plurality of receive data path circuits that respectively transmit and receive data serially on a corresponding plurality of network buses, a single transmit data path controller and a single receive data path controller that monitor status of and control operation of the respective transmit and receive data path circuits. Use of only two data path controllers eliminates the plurality of MACs used in prior art devices and therefore results in significant savings in die area.

One embodiment of a multi-media-access-controller (also called "multi-MAC") 200 (FIG. 2A) includes a single cyclic redundancy check (CRC) checker-generator 201, a single transmit data path controller 202, a number of transmit data path circuits 203A–203N, a a single receive data path controller 204 and a number of receive data path circuits 205A–205N that together implement various network protocol functions for transferring data over a number of network segments 206A–206N, where N is the number of segments.

Circuitry for controlling transmission or receipt of data, such as next state logic for a state machine, is included in one of data path controllers 202, 204 and is time multiplexed, e.g. shared during a cycle period 211 (FIG. 2B) comprised of a number of time slots 211A–211N, with the circuitry being dedicated in a given time slot to servicing only one of network segments 206A–206N. For example, transmit data path controller 202 receives status signals on a transmit status bus 214A and supplies control signals on a transmit control bus 214B, for a transmit data path circuit 203A during a time slot 211A, and then again during time slot 212A and then in 213A and so on. Similarly receive data path controller 202 receives status signals on a receive status bus 215A (FIG. 2A) and supplies control signals on a receive control bus 215B, for a receive data path circuit 205A during time slots 211A, 212A and 213A.

Also during a time slot (e.g. slot 211A), CRC checker-generator 201 is shared by a transmit and a receive data path circuit (e.g. circuits 203A and 205A). For example, CRC checker generator 201 receives data from a transmit data for CRC bus 218 and calculates a partial CRC for transmit data path circuit 203A during the first half of time slot 211A. In this example, CRC checker generator 201 uses data from a receive data for CRC bus 219 to calculate a partial CRC for receive data path circuit 205A during the second half of time slot 211A.

On receipt of a check CRC signal (e.g. on an end of packet) from a receive data path circuit 205A–205N, for example on a check CRC bus 220, CRC checkergenerator 201 generates a receive CRC status flag on line 221, after comparing the calculated CRC with an expected predetermined CRC, which flag controls a receive state machine implemented by receive data path controller 204. Similarly on receipt of a clear CRC signal, for example on a CRC control bus 222, CRC checker-generator 201 supplies the necessary bytes based on the calculated CRC on transmit CRC lines 223 for insertion into the packet being transmitted. CRC control bus 222 can carry a generate CRC signal, a hold CRC signal and a clear CRC signal (described above).

Insertion of such bytes is optional, based on a programmable mode indicated by a bit in a configuration register 224 through a transmit configuration bus 225 to transmit data path controller 202. Other bits in configuration register 224 can indicate other optional functions, such as padding a packet to a byte boundary. Bits in configuration register 224 can be set by a user through a bus interface unit in a manner known to a person of skill in the art. Transmit data path controller 202 updates transmit status registers 224 with status information (e.g. number of collisions) for access by a user through the bus interface unit.

Transmit data path controller 202 includes a control sequencer 231 (FIG. 3A) that successively generates address signals for accessing storage elements, in for example a dual port static random access memory (SRAM) 232. Each group of storage elements in SRAM 232 that are located at an address generated by control sequencer 231 and hold state and count signals for a transmit state machine that controls one of transmit data path circuits 203A–203N.

For each transmit data path circuit 203A–203N selected by control sequencer 231, a state counter logic 233 also included in transmit data path controller 202 receives state and count signals from SRAM 232 and uses transmit status signals that are received at status terminals 234 to generate control signals that are sent on transmit control bus 214B. State counter logic 233 also generates new state and count signals that are stored back in the selected storage elements of SRAM 232 through state bus 237 and counter bus 238.

Control sequencer 231 also drives a multiplexer 239 in transmit data path controller 202 that time division multiplexes numerous transmit status signals from each transmit data path circuit 203A–203N that are received on transmit status bus 214A on to status terminals 234 of state counter logic 233, so that status signals of a selected data path circuit are received simultaneous with receipt of state and counter signals from SRAM 232. Transmit data path controller 202 also includes a decoder 242 that routes control signals to the selected data path circuit.

Transmit data path circuits 203A–203N use control signals received at control terminals 251A–251N to control transfer of parallel data received on transmit input terminals 252A–252N (that are coupled to a transmit first-in-first-out (FIFO) memory) in serial form to transmit output terminals 254A–254N (that are coupled to the transmit data paths). Transmit data path circuits 203A–203N supply status signals on status terminals 255A–255N that are coupled to transmit status bus 214A. Transmit data path circuits 203A–203N also receive bytes on CRC terminals 256A–256N (that are coupled to the CRC checker-generator 201) for optional insertion as described below.

In one specific embodiment, SRAM 232 includes a counter RAM 301 (FIG. 3B) in which are stored various count signals for a data path circuit, a state RAM 302 in which are stored state and flag signals for transmit data path circuits 203A–203N, and ports 303 and 304 either of which can be used to address groups of storage locations in both counter RAM 301 and state RAM 302.

In this embodiment, each of groups 305A–305N of addressable storage locations in counter RAM 301 includes locations (called MAC1b counter locations) for jam count 311, transmit byte count 312, heart beat count 313, collision count 314 and locations (called MAC1a counter locations) for slot timer count 315, defer count 316 and backoff count 317. Use of such counts is well known to a person of skill in the art in view of the CSMA/CD protocol described in, "International Standard ISO/IEC 8802-3 ANSI/IEEE Std. 802.3" referenced above.

In this embodiment, each of groups 320A–320N of addressable storage locations in state RAM 302 includes locations (called MAC1 state locations) for counter control 321, flags 322, transmit state 323 and protocol state 324. The signal stored in counter control 321 determines if one or more of count signals stored in locations 311–317 are to be incremented, for example by incrementors 331–333.

In this embodiment, as an example, in a time slot 211A (FIG. 3C) for a group 305A, at time T1, a rising edge of first clock cycle 211A1 occurs, read address signals on lines 360 go valid and first counts from MAC1a counter locations 315–317 are latched in stage 1 latches 334 via lines 361. Simultaneously, at time T1, state signals from MACi state locations 321–324 flow via lines 365 to shift register 335 and to next state logic 350.

At time T2, a falling edge of first clock cycle 211A2, the latched first counts flow via lines 362 to incrementors 331–333 that are controlled by low order bit signals on lines 366 generated by shift register 335 from counter control 321.

Between times T1 and T3, next state logic 350 uses status signals received from multiplexer 239 and state signals from MAC1 state locations 322, 323 and 324 in RAM 302 to determine the next state signals for transmit state machines 323 and protocol state machines 324, and these next state signals are stored in holding register 345. Simultaneously, new flag values 322 are stored in holding register 345 by first logics 341–343: backoff logic 341, defer logic 341 and slot timer logic 343.

At time T3, a rising edge of second clock cycle 211A2 in time slot 211A occurs, control sequencer 231 generates addresses on lines 360 for MAC1b counter locations 311–314 and second counts are latched in stage 1 latches 334, while the incremented first counts are passed to stage 2 flip flops 336.

At time T4, a falling edge of second clock cycle 211A2 in time slot 211A occurs, stage 2 flip flops 336 store incremented values for first counts (for MAC1a counter locations) into themselves. Also at time T4, second counts flow to incrementors 331–333 that are controlled by high order bit signals generated by shift register 335 from counter control 321.

At time T5, a rising edge of first clock cycle 211B1 in time slot 211B occurs, addresses for first counts at MAC1a counter locations 315–317 are supplied by sequencer 231, for writing the incremented first counts from stage 2 flipflops 336 at time T6. At time T5, the incremented second counts are passed to stage 2 flip flops 336.

At time T6, a falling edge of first clock cycle 211B1 occurs, stage 2 flip-flops 336 store into themselves the incremented second counts from incrementors 331–333. At time T6, stage 2 flip-flops 336 drive input signals for second logics 346–349 (collision logic 346, heart beat logic 347, transmit byte logic 348 and jam logic 349) and the results of these logics are stored in holding register 345 at time T7.

At time T7, a rising edge of second clock cycle 211B2, sequencer 231 generates the addresses of second counts at MAC1b counter locations 311–314, for storage of second counts from stage 2 flip-flops 336 at time T8. Also at time T7, sequencer 231 generates the addresses of locations 321–324, for writing the values from holding register 345 at time T8.

In the above example, control signals on transmit control bus 214B are driven by decoder 242 and become valid between times T1 and T5.

First and second set logics 341–343 and 346–349 are well known to a person of skill in the art in view of the enclosed description and the CSMA/CD protocol referenced above. Although not described above, during time slot 211B and other subsequent time slots, operations similar to those described above for slot 211A take place for transmit data path circuit 203B and other circuits 203C–203N.

Stacking of second counts in locations 311–314 on top of first counts in locations 315–317 as described above which is possible when counts in the two sets have above the same length, eliminates the need to replicate three additional incrementors that would otherwise be required to process all counts simultaneously. Although only two sets of counts are stacked in this embodiment, any number of sets can be stacked in other embodiments of this invention.

Use of two separate RAMs 301 and 302 allows next state logic 350 to use signals from state RAM 302 to control counts in both the first set and the second set in counter RAM 301, and avoids the need to have an oblong shaped RAM.

Figure 3A:
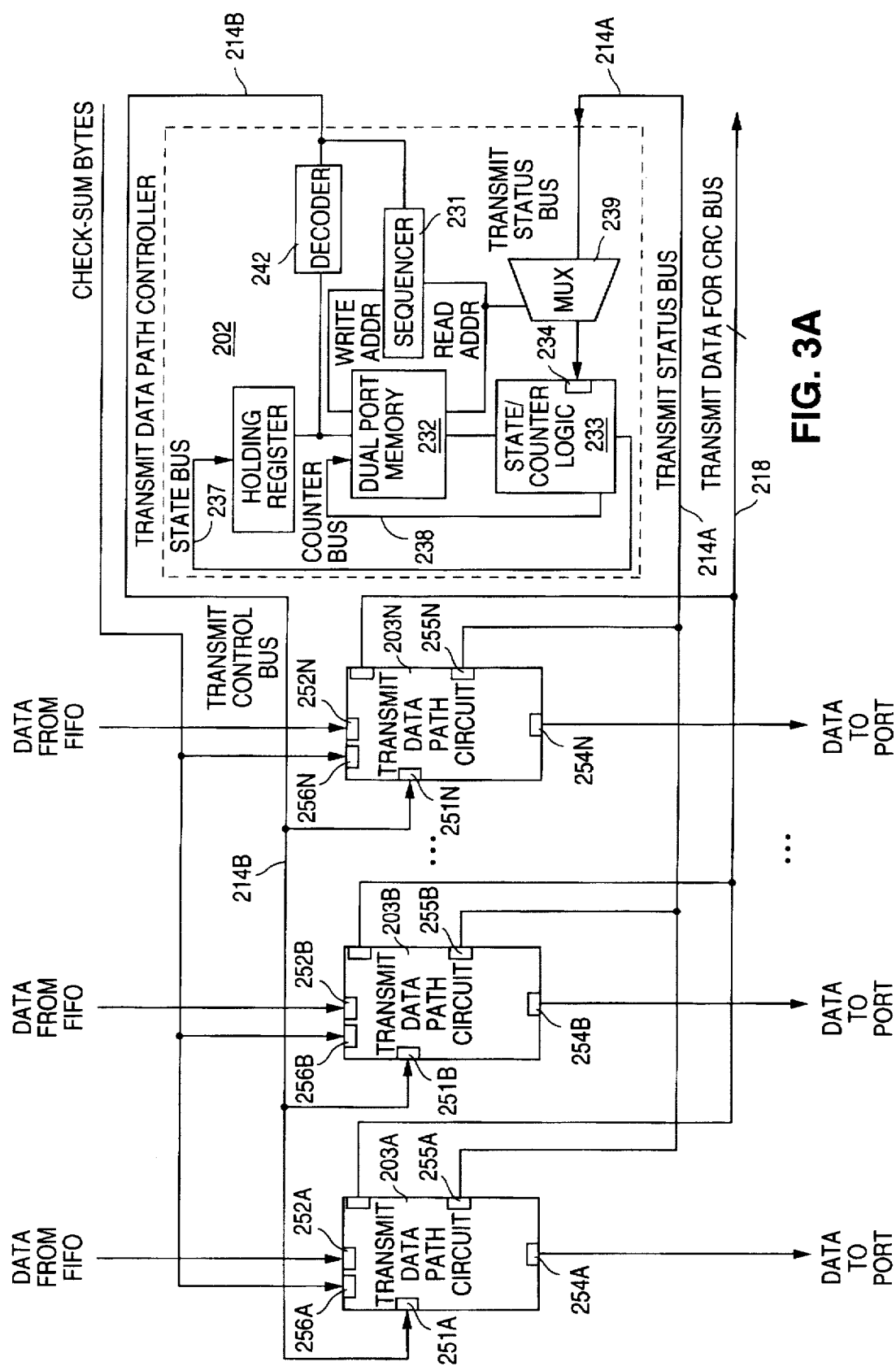
FIG. 3A illustrates in an intermediate-level block diagram of a transmit portion of the multi-media-access-controller of FIG. 2A.
Figure 3B:
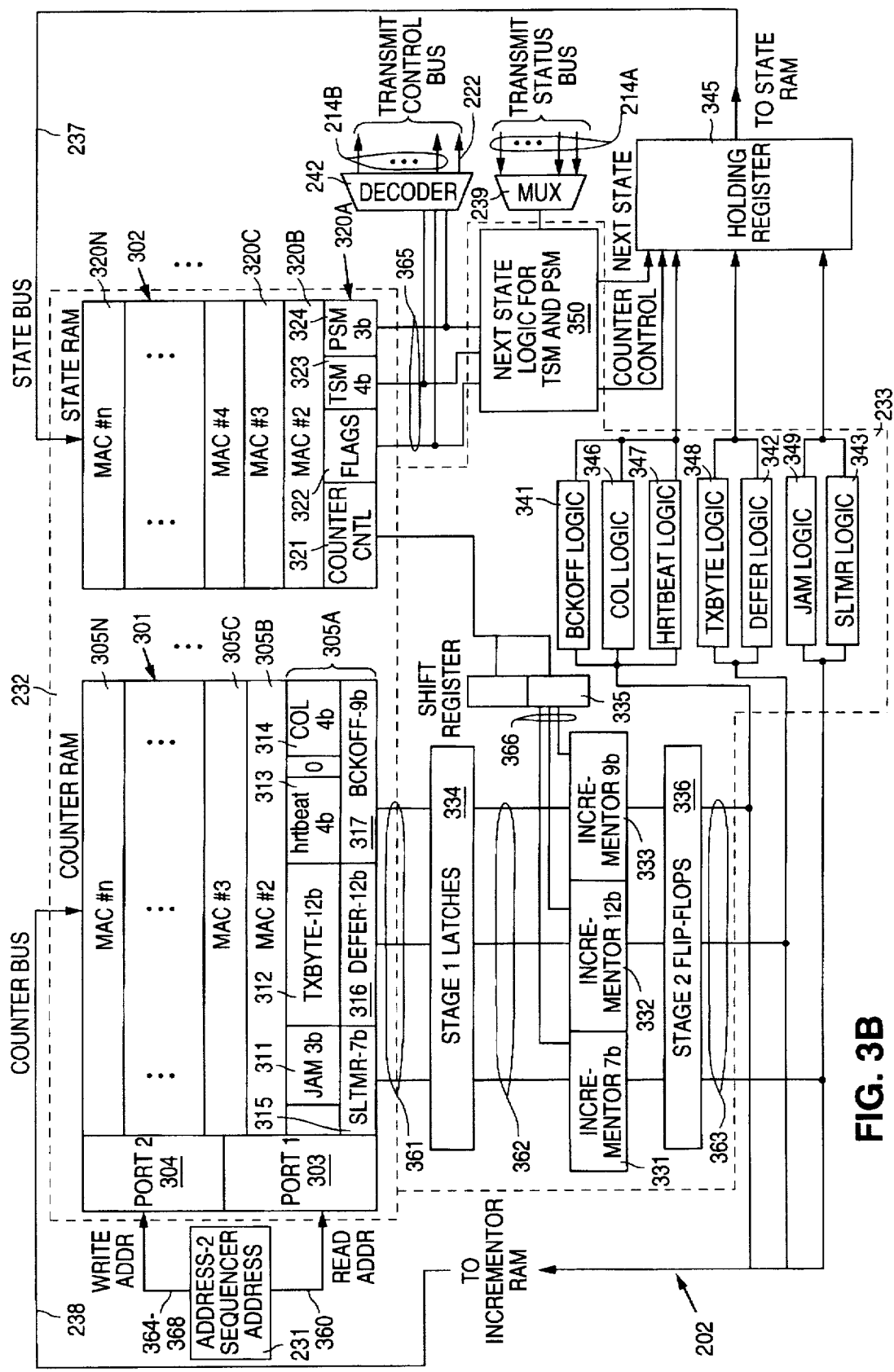
FIG. 3B illustrates a low-level block diagram of the transmit data path controller of FIG. 2A.
Figure 3C:
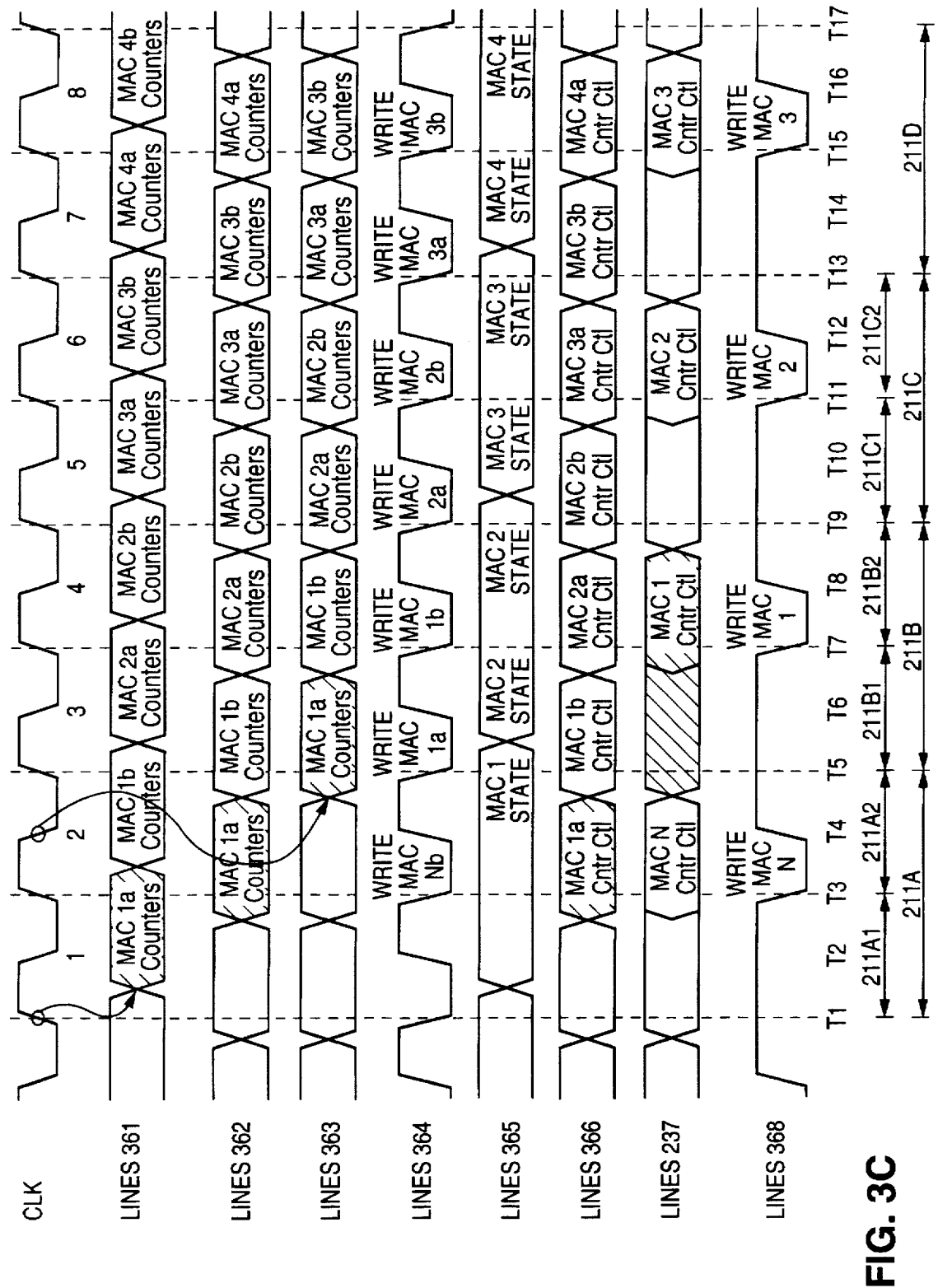
FIG. 3C illustrates in a timing diagram the timing relation of signals on various lines in FIG. 3B.

Receive data path controller 204 (FIG. 4A) has similar components as those illustrated for transmit data path controller 202, and reference numerals added in FIG. 4A were derived from reference numerals in FIG. 3A that represent similar components. As illustrated in FIG. 4A, receive data path controller 204 has only a single state bus 437 rather than a state bus and a counter bus as in transmit data path controller 202 (FIG. 3A).

In one specific embodiment, SRAM 432 includes is a single RAM in which each addressable group 460A–460N of locations stores a count flag 461, a byte count signal 462 and a receive state 463. Count flag 461 determines if byte count signal 462 is to be incremented by incrementor 465. Receive data path controller 204 also includes stage 1 latches 466 and stage 2 flip-flops 467 that function in a similar manner to the latches 334 and flip-flops 336 and impose similar timing constraints.

Figure 4C:
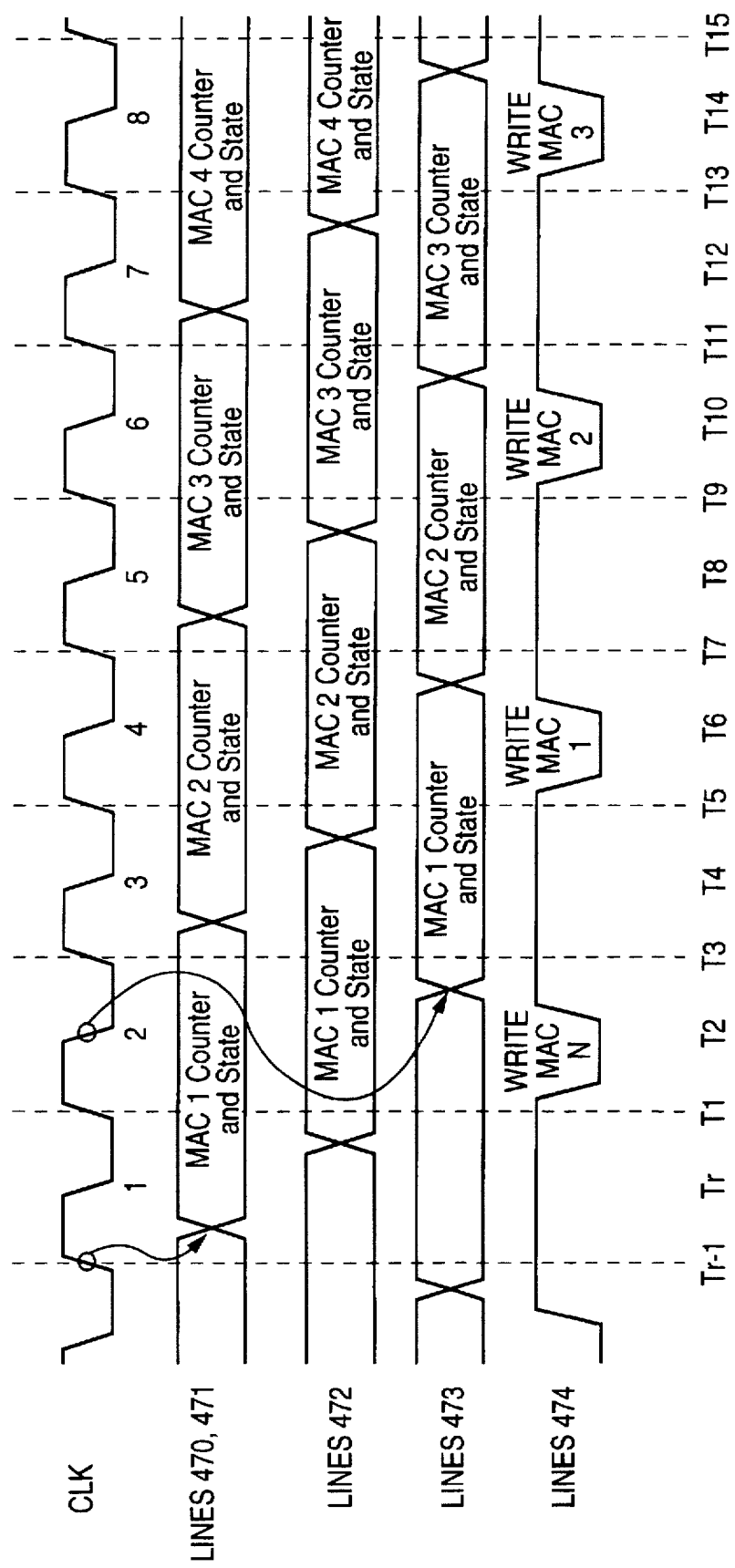
FIG. 4C illustrates in a timing diagram the timing relation of signals on various lines in FIG. 4B.

Specifically, in this embodiment, as an example, at time Tr-1 (FIG. 4C), in a time slot prior to time slot 211A, read address signals on lines 470 go valid and signals from MAC1 locations 461–463 in group 460A are latched in stage 1 latches 466 via lines 471.

At time Tr, half a clock cycle before start of time slot 211A, the latched signals flow via lines 472 to incrementor 465 and next stage logic 433. Between times Tr-1 and T1, next state logic 433 uses status signals from multiplexer 439 and latched state signals to determine the next state signals for receive state machine 463.

At time T1, a rising edge of first clock cycle 211A1 occurs and the updated signals are stored in stage 2 flip flops 467. At time T2, a falling edge of first clock cycle 2iiAi occurs and stage 2 flip flops 467 supply the updated signals on lines 473. At time T5, addresses for MAC1 locations 461–463 are supplied by sequencer 431 on lines 474, for writing the updated signals from stage 2 flip flops 467 at time T6.

In one specific embodiment, receive data path circuits 205A–205N (FIG. 2A) start latching data (beginning with start of frame "SOF") independent of when the time slot allocated by receive data path controller 204 occurs. To sample the carrier sense signal CRS and align SOF to the allocated time slot, receive data path circuit 205A includes a shift register 501 (FIG. 5A) having a length of 2n, wherein n is the number of bus cycles that occur on receive input terminal 454A during a cycle period 211 (FIG. 2B). The cycle period is the total of all time slots needed by receive data path controller 204 to complete one cycle, by servicing each receive data path circuit's status signals.

In this embodiment, receive data path circuit 205A uses a 12 bit deserializer 502, because receive data path controller 204 services status signals within the time a nibble of data is received. Control of data in receive data path circuit 205A is done on a nibble basis in receive data path controller 204, because each bit is received or transmitted at 10 megabits/second, allowing 100 nanoseconds per bit with 400 nanoseconds per nibble. Therefore receive data path controller 204 completes a cycle period of all data path circuits within 400 nanoseconds. Other embodiments with faster technology, can operate on a byte or word basis, depending on the total number of data path circuits that need to be serviced. Moreover, another advantage of a nibble data size is the compatibility of receive data path controller 204 with the new 100 megabyte ethernet protocol allows scaling by hundred.

Shift register 501 buffers carrier sense signal CRS so that start frame detect logic 503 can align to the received nibble. As noted above, if less than a nibble is received after carrier sense signal CRS goes high and before the corresponding time slot occurs, start frame detect logic 503 waits for the next cycle period to drive multiplexers 508 and 509. Once aligned, each received nibble is held in a holding register 505 and transferred from receive output terminal 452A to a FIFO. The received nibble is also supplied on receive data for CRC bus 219 to the CRC checker-generator 201. Also, once aligned, the received nibble can continue to be identified and supplied until alignment is lost.

Alignment can be lost if for example the rate of data received at receive input terminal 454A (e.g. signal RXC in FIGS. 5B–5D described below) is faster than the sequencer decode signal (of 25 MHz in one embodiment) on receive control bus 215 and causes an overrun or underrun of deserializer 502, which results in a data rate mismatch error. A gradual shift in data rate over a long period of time can be corrected by start frame detect logic 503 moving forward or backward by one bit a window that identifies the 4 bits to be transferred to multiplexer 507 in the next cycle period, as described in the following example.

FIGS. 5B–5D illustrate one specific example of the timing relation between receipt of a packet and a time slot corresponding to receive data path circuit 205A. In this example, carrier sends signal CRS goes high at time T0. At time T1, after receipt of three bits by receive data path circuit 205A, the corresponding time slot starts (e.g. sequencer decode signal from transmit data path controller 202 goes high). At this time T1, multiplexer 508 points to bit 3, so that the next set of valid bits are 4–7 for a nibble of data.

Therefore, at time T2, when the next rising edge of the sequencer decode signal occurs, multiplexer 508 points to the bits 4–7 that are transferred to multiplexer 507, then sampled by 16 bit holding register 505. Bits 4–7 are held as the first nibble in register 505, with the rest of the high order nibbles being zero (as this is the beginning of the packet). During subsequent times, register 505 refreshes the first valid nibble (that was received as bits 4–7) and the high order zero bits.

At the next rising edge of the sequencer decode signal, multiplexer 508 continues to point to deserializer 502's bits 4–7, so that bits 4–7 that were received during time interval T2-T3 are then transferred into holding register 505 as the second low order nibble. In this manner, holding register 505 is completely filled with four nibbles, at which time transmit data path controller 202 drives a signal active to a receive first-in-first-out memory (FIFO). The receive FIFO transfers all 16 bits from holding register 505, and holding register 505 becomes available for the next nibble, at the next time when the sequencer decode signal goes high.

In one specific embodiment, the receive FIFO is included in a multi-FIFO of the type described in a jointly-owned, concurrently filed, copending U.S. Pat. application Attorney Docket No. NS-2804, entitled "A Multi-First-In-First-Out Circuit" filed by Wakeman et al. that is incorporated herein by reference in its entirety In this specific embodiment, at time T1 (FIG. 5B), the rising edge of the sequencer decode signal occurred after a time difference ΔT1 of the rising edge of the third bit on receive data clock signal RXC. After a long period of time, such as many clock cycles of the sequencer decode signal, at time Tm (FIG. 5C), the rising edge of the sequencer decode signal occurs after a time difference ΔTm after the rising edge of the third bit. Time difference ATm is less than half of a clock cycle in signal RXC, which is a minimum time difference required to be maintained in this example. Therefore, to avoid errors that can happen if signal 4–7 valid is used, SFD detect logic 503 causes multiplexer 508 to point to bits 3–6 for shifting into holding register 505.

If SFD detect logic 503 failed to make this change, after a long period of time, the rising edge of sequencer decode signal will occur at time Tn, before occurrence of the rising edge of bit 4, resulting in unpredictable errors. If the SFD detect logic 503 is unable to move the multiplexer 508, for example, because such a correction for data rate shift has been done previously a number of times, so that deserializer 502 is underrun, a data rate mismatch error occurs.

As the receive data comes in on lines 219, the receive data is used to calculate the CRC by CRC calculator 604. Also, as the receive data comes in, the receive data is compared to the partial CRC that was received from the location MAC1RX of the RAM 601. If the comparison was equal, then the flags from RAM 601 are incremented. If they are not equal, the flags are cleared. On receipt of a signal indicating end of packet on line 220, logic 602 decodes flags from RAM 601 and drives a receive check status flag on line 221.

Receive data path circuit 205A also includes a frame alignment detection logic 510 that uses the carrier sense signal CRS to drive a frame alignment error signal FAE on receive status bus 214.

Receive data path circuit 205A also includes a multiplexer 511 that appends a packet error word supplied by receive data path controller 204 to be stored with the received data in the FIFO. The packet error word contains the status of various errors such as packet reject, jabber, runt, collision, crc error, fae error and other information such as multicast or broadcast packet.

In this embodiment, transmit data path circuit 203A (FIG. 2A) includes a holding register 551 (FIG. 5E) that receives a 32-bit word to be transmitted. A multiplexer 552 transfers the received word to shift register 553 in two operations: low order 16 bits and then high order 16 bits, based on a signal on a first multiplexer control line 554 that is driven by decoder 242 in transmit data path controller 202 in the manner described above. Shift register 553 is a nebblizer that transfers 4 bits at a time to multiplexer 555. Multiplexer 555 can insert other nibbles, such as jam, preamble, start-of-frame and padding as necessary, based on a signal on second multiplexer control line 556.

CRC checker-generator 201 (FIG. 2A) calculates CRCs of packets received at each receive input terminal 454A–454N and also of packets transmitted on each transmit output terminal 254A–254N. CRC checker-generator 201 calculates and saves a partial CRC for each transmitted and received packet in a CRC RAM 601 (FIG. 6A). An outgoing decode logic 602 in CRC checker-generator 201 supplies a flag on line 221 indicating if a calculated CRC matched a received checksum in response to a signal on check CRC signal line 220 coupled to receive data path controller 204. Receive data path controller 204 may drive the signal on line 220 active in response to an end of packet signal from receive data path circuit 205A–205N. Logic 602 also supplies a calculated CRC in response to a signal on generate CRC line 222 coupled to transmit data path controller 202.

CRC checker-generator 201 also includes a CRC sequencer 603 and a single CRC calculator 604. CRC sequencer 603 generates address signals in a sequential roll-over fashion to allow CRC calculator 604 to read and update partial CRCs stored in checksum RAM 601 for each data path circuit (transmit and receive).

In one embodiment, during the first half of a time slot 211 (FIG. 2B), CRC calculator 604 uses data being transmitted to calculate a partial CRC for transmit data path circuit 203A and during the second half of the same time slot 211, CRC calculator 604 uses data being received to calculate a partial CRC for receive data path circuit 205A. The data being transmitted or received is supplied by incoming decode logic 605 that is driven by CRC sequencer 603.

Operation of CRC checker-generator 201 is similar to the operation of receive data path controller 204 described above, except for timing. Specifically, at time T1 (FIG. 6B) read address signals on lines 613 go valid and signals from RX MAC1 locations are latched in stage 1 latches 614 via lines 610. At time T2, the latched signals flow via lines 611 to incrementor 615 and CRC calculator 604.

Between times T1 and T3, CRC calculator 604 uses signals from bus 219 and lines 611 to recalculate the CRC for data being received on receive data path 205A as follows. As the receive data comes in on lines 219, the receive data is used to calculate the CRC by CRC calculator 604. Also, as the receive data comes in the receive data is compared to the partial CRC that was received from the location RXMAC1 of RAM 601. If the comparison was equal, then the flags from RAM 601 are incremented by incrementor 615. If they are not equal, the flags are cleared.

At time T3, the updated CRC and flags are stored in stage 2 flip flops 616. At time T4, a falling edge occurs and stage 2 flip flops 616 supply the updated signals on lines 612 to outgoing decode logic 602. On receipt of a signal indicating end of packet on line 220, logic 602 decodes the flags from RAM 601 and drives a receive check status flag on line 221.

At time T5, addresses for RX MAC1 locations are supplied by CRC sequencer 602 and the updated signals are written to RAM 601 at time T6. Operation of CRC checker-generator 201 for transmit data path circuit 203A at times T3 onwards is similar to that described above for the receive data path circuit 205A.

Time multiplexed use of circuitry that can be commonly shared by a number of data path circuits 203A–203N and 205A–205N as described herein eliminates wastage of integrated circuit real estate that is inherent in the prior art's use of a plurality of individual, separate MACs. Moreover, use of dual-port RAM allows the state and counters of the next state machine to be simultaneously read, while a current state machine's state and counters are being stored in the RAM. Also, state machine implementation using RAM as described herein is more efficient space wise than using flip flops.

It is to be understood that the above description is intended to be illustrative and not restrictive. Many variations of the invention will become apparent to those of skill in the art upon review of this disclosure. Although one implementation of a data path controller has been disclosed based on a specific state machine implementation, any types of hardware or software can be used in other embodiments. Moreover, although the data path controller has been disclosed as being used to couple a number of ethernet buses, such a data path controller can be used with other buses in other embodiments. Therefore numerous modifications and adaptations of this invention are covered by the appended claims.

We claim:

1. A multi-media-access-controller comprising:

a plurality of transmit data path circuits, said transmit data path circuits transmitting data on a corresponding plurality of network buses, the number of transmit data path circuits being equal to the number of network buses, each transmit data path circuit comprising:

a plurality of transmit input terminals, a transmit control terminal, a transmit status terminal, and a transmit output terminal, the transmit output terminal being coupled to only one of the network buses;

wherein each transmit data path circuit receives parallel data on the transmit input terminals and supplies the received data serially on the transmit output terminal in response to an active control signal on the transmit control terminal; and a transmit data path controller comprising a transmit control bus and a transmit status bus, said transmit control bus being coupled to each transmit control terminal and said transmit status bus being coupled to each transmit status terminal; wherein:

said transmit data path controller drives said control signal active on said transmit control bus successively to each transmit data path circuit in time multiplexed sequential service; and said transmit data path controller receives a status signal successively from each transmit data path circuit during the time multiplexed sequential service.

2. The multi-media-access-controller of claim 1, wherein said transmit data path controller further comprises:

a sequencer;

a plurality of groups coupled to said sequencer, each group comprising a plurality of storage elements for storing a plurality of counters for each of said transmit data path circuits; and a logic having a plurality of input terminals coupled to said storage elements, a status input terminal coupled to said transmit status bus and a counter bus coupled to said storage elements;

wherein said sequencer generates address signals to read counters from each group successively during said sequential service, the read counters being supplied to the input terminals of said logic, and said logic drives signals on said counter bus to update said counters in response to signals received from said transmit status bus, thereby to control the supply of data to each network bus depending on the status of data previously supplied to said network bus.

3. The multi-media-access-controller of claim 2 further comprising a multiplexer having a plurality of input terminals coupled by said transmit status bus to said transmit status terminals and an output line coupled to said status input terminal of said logic.

4. The multi-media-access-controller of claim 1, wherein said transmit input terminals are coupled to a first-in-first-out memory that buffers data to be transmitted on said transmit output terminal, said first-in-first-out memory being separate and distinct from the transmit data path circuit.

5. The multi-media-access-controller of claim 1, wherein said transmit data path circuit comprises a holding register and a shift register and said transmit data path circuit transfers a portion of data stored in said holding register into said shift register in response to a signal on said transmit control terminal, said portion being indicated by said signal; and further wherein said transmit data path circuit serializes said portion and supplies said serialized portion on said transmit output terminal.

6. The multi-media-access-controller of claim 1 wherein said time multiplexed sequential service has a cycle period comprised of a plurality of time slots, the number of time slots in said plurality being equal to the number of said network buses, the transmit data path controller being dedicated in a given time slot to servicing only one of the network buses.

7. The multi-media-access-controller of claim 1 further comprising:

a plurality of storage elements for storing at least one state for each of the transmit data path circuits; and a next state logic that uses a state from the storage elements to drive the control signal.

8. The multi-media-access-controller of claim 7 wherein each of the network buses is an ethernet bus, and the next state logic implements a CSMA/CD protocol.

9. The multi-media-access-controller of claim 1 further comprising a CRC circuit coupled to said transmit output terminal, wherein said CRC circuit generates, during said sequential service, a partial CRC for the data being supplied at said transmit output terminal.

10. The multi-media-access-controller of claim 1 further comprising:

a receive data path controller having a receive control bus;

a plurality of receive data path circuits that receive data serially from said corresponding plurality of network buses, the number of receive data path circuits being equal to the number of network buses, each receive data path circuit comprising a plurality of receive output terminals, a receive control terminal, a receive status terminal and a receive input terminal, said receive control terminal being coupled to said receive control bus;

wherein each receive data path circuit receives serial data on the receive input terminal independent of the receipt of a signal on said receive control terminal, and each receive data path circuit supplies the received data in a parallel form on the plurality of receive output terminals in response to the signal on said receive control terminal; and further wherein said receive data path controller drives a signal active on the receive control bus successively to each receive data path circuit during said sequential service.

11. The multi-media-access-controller of claim 10, wherein one of said receive data path circuits comprises a shift register, said shift register having a length greater than or equal to 2n, where n is the number of cycles that occur on the receive input terminal between two successive active signals on the receive control terminal.

12. The multi-media-access-controller of claim 10, wherein one of said receive data path circuits comprises a holding register, said holding register having a length greater than or equal to m*n, where n is the number of bus cycles that occur on the network receive line between two successive active signals on the receive control terminal, and m is the number of active signals required to receive data sufficient to fill a storage location in a first-in-first-out memory coupled to said receive data path circuit.

13. The multi-media-access-controller of claim 10, wherein said transmit output terminal is coupled to a network transmit line for serial transmission of data on a network bus and said receive input terminal is coupled to a network receive line for receipt of serial data from said network bus.

14. The multi-media-access-controller of claim 1 further comprising:

a plurality of storage elements for storing at least on state for each of said transmit data path circuits; and a next state logic that uses a state from the storage elements to drive said control signal.

15. The multi-media-access-controller of claim 14 further comprising:

a CRC circuit coupled to each of said transmit data path circuits, wherein said CRC circuit calculates, while the control signal is active for a transmit data path circuit, a partial CRC for data being transferred by the transmit data path circuit.

16. The multi-media-access-controller of claim 14, wherein each of said transmit data path circuits include a shift register, and each of said transmit data path circuits uses said shift register to serialize or deserialize the data being transferred by the transmit data path circuit.

17. The multi-media-access-controller of claim 14, wherein each of said buses is an ethernet bus, and the next state logic implements a CSMA/CD protocol for each of the ethernet buses.

18. The multi-media-access-controller of claim 14 wherein said sequential service has a cycle period comprised of a plurality of time slots, the number of time slots in said plurality being equal to the number of said buses, the next state logic being dedicated in a given time slot to servicing only one of the buses.

* * * * *

UNITED STATES PATENT AND TRADEMARK OFFICE
CERTIFICATE OF CORRECTION

PATENT NO.    : 5,790,786
ISSUE DATE    : August 4, 1998
INVENTOR(S)   : Wakeman, Larry N.; Myers, Jr., Roy T.

It is certified that error appears in the above-identified patent and that said Letters Patent is hereby corrected as shown below:

Column 4, line 24,

Delete second occurrence of "a".

Column 13, line 16,

Delete "on" and insert --one--;

Column 3, line 29,

Delete "3"; and

Column 9, line 8,

After "entity" insert --.-- and start new paragragh with "In this specific embodiment,".

Signed and Sealed this

Fifteenth Day of May, 2001

*Attest:*

NICHOLAS P. GODICI

*Attesting Officer*     Acting Director of the United States Patent and Trademark Office